United States Patent [19]

Fiori et al.

[11] Patent Number: 5,466,745
[45] Date of Patent: Nov. 14, 1995

[54] EMULSIFIABLE COMPOSITIONS, CURABLE EMULSIONS THEREOF AND USES OF SUCH CURABLE EMULSIONS

[75] Inventors: Denise E. Fiori, Trumbull; Richard J. Quinn, Bethel, both of Conn.

[73] Assignee: Cytec Technology Corporation, Wilmington, Del.

[21] Appl. No.: 419,344

[22] Filed: Apr. 10, 1995

Related U.S. Application Data

[63] Continuation of Ser. No. 181,949, Jan. 14, 1994, abandoned.

[51] Int. Cl.$^6$ .............................. C08F 2/32; C08L 75/12; C08G 18/28; C08G 18/48
[52] U.S. Cl. ........................ 524/801; 524/591; 528/65; 528/76; 528/82
[58] Field of Search .................... 524/590, 591, 524/801; 525/455; 528/44, 60, 61, 65, 66, 68, 71, 76, 77, 82, 84, 85

[56] References Cited

U.S. PATENT DOCUMENTS

| | | | |
|---|---|---|---|
| 4,396,738 | 8/1983 | Powell et al. | 524/228 |
| 4,413,112 | 11/1983 | Reiff et al. | 528/73 |
| 4,433,095 | 2/1984 | Hombach et al. | 524/563 |
| 4,480,070 | 10/1984 | Bosscher et al. | 524/591 |
| 4,663,377 | 5/1987 | Hombach et al. | 524/196 |
| 4,711,918 | 12/1987 | Kubitza et al. | 524/196 |
| 5,075,370 | 12/1991 | Kubitza et al. | 524/591 |
| 5,200,489 | 4/1993 | Jacobs et al. | 528/49 |
| 5,202,377 | 4/1993 | Thorne et al. | 524/591 |
| 5,252,696 | 10/1993 | Laas et al. | 528/76 |
| 5,304,400 | 4/1994 | Dhein et al. | 427/388.4 |

FOREIGN PATENT DOCUMENTS

| | | |
|---|---|---|
| 2059420A1 | 7/1992 | Canada. |
| 2080457A1 | 4/1993 | Canada. |
| 2083103A1 | 5/1993 | Canada. |
| 2082784A1 | 5/1993 | Canada. |
| 2082785A1 | 6/1993 | Canada. |
| 2090144A1 | 8/1993 | Canada. |
| 0369389A1 | 5/1990 | European Pat. Off.. |
| 0523994A1 | 1/1993 | European Pat. Off.. |
| 0562282A1 | 9/1993 | European Pat. Off.. |
| 2643642A1 | 3/1978 | Germany. |
| 59-191770 | 10/1984 | Japan. |
| 1162409 | 8/1969 | United Kingdom. |
| 1530022 | 10/1978 | United Kingdom. |
| 1530021 | 10/1978 | United Kingdom. |
| 2018796A1 | 10/1979 | United Kingdom. |
| WO93/05087 | 3/1993 | WIPO. |
| WO9403511 | 2/1994 | WIPO. |
| WO94/03513 | 2/1994 | WIPO. |
| WO94/03512 | 2/1994 | WIPO. |
| WO94/03516 | 2/1994 | WIPO. |

OTHER PUBLICATIONS

Cullen, N. T., "Low–Voc Polyruethane Coatings: Current Successes and Processing Development," *American Paint & coatings Journal* (Aug. 19, 1991), pp. 44–49 and 64.

*Primary Examiner*—Peter A. Szekely
*Attorney, Agent, or Firm*—Bart E. Lerman; Claire M. Schultz; Michael J. Kelly

[57] ABSTRACT

Provided is a non-aqueous, emulsifiable composition which, in its overall concept, comprises a substantially homogenous mixture of an unblocked polyisocyanate crosslinking agent and a surface active isocyanate reactive material. Also provided is a substantially homogeneous, curable, oil-in-water emulsion produced by, as well as a method of producing such by, the steps of admixing the components of the non-aqueous emulsifiable composition as described above and, thereafter, contacting such emulsifiable composition and an aqueous medium in proportions and under conditions so as to result in a substantially homogeneous, oil-in-water emulsion. Such curable emulsions find particular use in a variety of coatings applications.

80 Claims, No Drawings

EMULSIFIABLE COMPOSITIONS, CURABLE EMULSIONS THEREOF AND USES OF SUCH CURABLE EMULSIONS

This application is a continuation of U.S. application Ser. No. 08/181,949, filed Jan. 14, 1994, abandoned.

BACKGROUND OF THE INVENTION

1. Field of the Invention

The present invention relates generally to substantially homogeneous, emulsifiable compositions which contain a polyisocyanate crosslinker and a surface active isocyanate reactive material. The present invention also relates to curable emulsions prepared by emulsifying in water such substantially homogenous emulsifiable compositions, as well as uses of the so-prepared curable emulsions.

2. Description of the Related Art

Isocyanate crosslinked systems are in general well known. As an example, polyurethane films can be formed from coating compositions based upon polyols and polyisocyanate crosslinking agents. Polyurethane coatings can be formulated to provide fast curing characteristics, as well as a desirable combination of abrasion resistance, flexibility, adhesion, chemical resistance and appearance characteristics in the resulting films.

Due to the reactivity of isocyanates with active hydrogen containing compounds, including water, polyurethane coatings have historically been formulated as two-component organic solvent based systems. One-component systems, both organic solvent based and waterborne (see GB1530021 and GB1530022), have also been formulated by blocking of the isocyanate groups via well-known blocking agents.

Despite the excellent films which can be achieved with some of these systems, and particularly the two-component organic solvent based systems, the coatings industry is under great pressure to reduce the environmentally undesirable emission of volatile organic compounds (VOC), which includes the organic solvent media as well as the common blocking agents. One means of doing so, of course, would be to exchange some or all of the liquid organic solvent medium with water. Unfortunately, the switch from organic solvents to water is neither a simple nor straightforward matter, particularly in the case of common isocyanate crosslinkers which are not only reactive with water, but are also hydrophobic and non-dispersible.

Several approaches to lowering the VOC of polyurethane coatings are discussed N. T. Cullen, "Low-VOC Polyurethane Coatings: Current Successes and Promising Developments," *American Paint & Coatings Journal*, Aug. 19, 1991, pp. 44–49 and 64. One such approach has been to preform a water-dispersible film-forming polyurethane polymer by reacting a polyisocyanate with a hydrophilic reactive component, then dispersing the so-preformed hydrophilic polymer in water. A variation on this approach disclosed in GB1162409 is to preform the polyurethane polymer in situ in the aqueous medium with the aid of non-reactive surfactants. A still further variation on this approach is described in EP-A-0369389, in which a lower molecular weight water-dispersible prepolymer containing residual isocyanate functionality is first formed by reaction of a mixture of isocyanates with a polyol chain containing hydrophilic groups, after which the prepolymer is dispersed in water and chain extended or crosslinked. Upon application of these preformed polymer systems to a substrate, films are formed primarily via physical drying mechanisms due to evaporation of the liquid medium (water). While such preformed polyurethane systems can significantly reduce emitted VOC's, they often can suffer from application and stability problems. In addition, films produced from such systems can suffer from poor water resistance due to the hydrophilic nature of the preformed polymers or surfactants remaining after cure.

In another approach disclosed in GB-A-2018796 and U.S. Pat. No. 4,663,377, an emulsifiable polyisocyanate mixture comprising (a) a hydrophilic isocyanate functional oligomer and (b) a polyisocyanate, is produced by partially reacting a polyisocyanate with, for example, a hydrophilic polyether alcohol. Curable coating and adhesive compositions can be formed by combining these polyisocyanate emulsions with separate aqueous resins. The emulsifiable polyisocyanate mixtures of these references, however, suffer from low isocyanate content which results from the destruction of some of the isocyanate groups when the polyisocyanate is allowed to partially react with the polyether, as well as the destruction of some of the isocyanate groups due to the reaction with water upon and after emulsification. Predictably, a low isocyanate content would severely reduce the ability of these polyisocyanate mixtures to function as efficient crosslinkers in coating compositions. In addition, these polyisocyanate emulsions suffer from stability problems due to the reaction of isocyanate groups with water, particularly those on the hydrophilic component (a).

In a similar approach disclosed in U.S. Pat. No. 5,202,377, an emulsifiable polyisocyanate mixture comprising (a) a hydrophilic tertiary isocyanate functional oligomer and (b) a polyisocyanate having tertiary isocyanate groups, is produced by partially reacting a polyisocyanate containing tertiary isocyanate groups with a hydrophilic polyether. Coating compositions can be formed by combining (i) these polyisocyanate emulsions with (ii) separate aqueous solutions, emulsions or dispersions of film-forming polymers containing isocyanate-reactive functionality. These emulsifiable mixtures are said to produce more stable emulsions than those of U.S. Pat. No. 4,663,377 due to the lower reactivity of tertiary isocyanate groups. Despite the lower reactivity of the tertiary isocyanate groups, coatings produced from these emulsions may still suffer from low isocyanate content as well as stability problems.

Still another approach to reducing the VOC of isocyanate crosslinked systems is found in U.S. Pat. No. 5,075,370. This reference generically discloses an aqueous coating composition comprising an aqueous solution and/or dispersion of a surface active isocyanate reactive resin (anionic olefinic polyol) into which a specific relatively low viscosity liquid unblocked polyisocyanate crosslinker is emulsified. The disclosed aqueous coating compositions are produced by emulsifying the isocyanate crosslinker into the aqueous solution and/or dispersion of the isocyanate reactive resin. It has, however, been found that, when systems were prepared in accordance with the teachings of U.S. Pat. No. 5,075,370 (emulsification of the isocyanate into the aqueous resin solution/dispersion), that the isocyanates do not properly incorporate into the resin solution/dispersion nor is an acceptable emulsion produced. After a short period of time a two phase system results, and films obtained from such systems display poor appearance characteristics, are hazy, contain microblisters, and have little or no gloss.

All of the aforementioned references are incorporated herein for all purposes as if fully set forth.

SUMMARY OF THE INVENTION

It has surprisingly been discovered that superior results are obtainable when, in contrast to the procedure of U.S. Pat.

No. 5,075,370, a curable oil-in-water emulsion is prepared by a process which includes the step of contacting a non-aqueous substantially homogeneous emulsifiable composition with water as its last step. In contrast to the systems of the above mentioned art, the emulsions prepared by the process of the present invention are substantially homogeneous. On standing, they do not separate into two phases and have a relatively long pot life before gelation. When cured, films obtained from curable emulsions prepared in accordance with the present invention have surprisingly improved physical and appearance characteristics over films from curable systems prepared in accordance with the process of U.S. Pat. No. 5,075,370. Furthermore, by proper selection of the emulsion components, films can be obtained which possess outstanding clarity and gloss, and contain minimal or no microblisters.

In accordance with the broadest aspects of the present invention, there is provided a non-aqueous, emulsifiable composition which, in its overall concept, comprises a substantially homogenous mixture of:

(1) an unblocked polyisocyanate crosslinking agent; and (2) a surface active isocyanate reactive material.

Optionally, such emulsifiable composition may also comprise one or more of a neutralizing agent for rendering the surface active isocyanate material water-dispersible, a relatively minor amount of an organic solvent, a cure catalyst, and other well known auxiliaries and additives suited for the particular end use.

The present invention also provides a curable, oil-in-water emulsion comprising an aqueous medium having substantially homogeneously emulsified therein the non-aqueous emulsifiable composition as set forth above.

The present invention further provides a method of producing such curable, oil-in-water emulsion comprising the steps of:

(a) admixing the components of the non-aqueous emulsifiable composition as described above; and thereafter (b) contacting such emulsifiable composition and an aqueous medium in proportions and under conditions so as to result in a substantially homogeneous, oil-in-water emulsion.

The present invention still further provides a method for coating a substrate by applying such substantially homogeneous, curable oil-in-water emulsion onto a substrate and, thereafter, curing said emulsion either at ambient or elevated temperatures depending upon the components and ultimate end use.

Finally, the present invention provides an article coated with a cured film derived from such a substantially homogeneous, curable, oil-in-water emulsion.

Advantages of the various aspects of the present invention include the following:

(1) the emulsifiable compositions of the invention are substantially homogenous, a property which facilitates the formation of substantially homogeneous curable emulsions;

(2) the curable emulsions of the present invention are substantially homogenous and do not separate into two phases;

(3) the curable emulsions of the present invention have a long pot life prior to gelation thereby providing a longer time period in which to coat a substrate;

(4) the curable emulsions of the present invention can be formulated to cure efficiently at room temperature, making it usable in situations where ambient cure is necessary,-such as in automotive refinish applications;

(5) the curable emulsions of the present invention can also be formulated to cure at elevated temperatures, making them suitable for use in high performance coating applications;

(6) the curable emulsions of the present invention have reduced VOC emission and, therefore, are particularly suitable for use in situations where environmental concerns or regulatory requirements preclude the use of high VOC solvent based systems; and (7) by proper component selection, films can be obtained from the curable emulsions which possess excellent appearance, physical and resistance characteristics, even comparable to that of organic solvent based systems.

These and other features and advantages of the present invention will be more readily understood by those skilled in the art from a reading of the following detailed description.

DETAILED DESCRIPTION OF THE PREFERRED EMBODIMENTS

As indicated above, the present invention provides, in its broadest concept, a non-aqueous emulsifiable composition comprising a substantially homogeneous mixture of:

(1) an unblocked polyisocyanate crosslinking agent; and (2) a surface active isocyanate reactive material.

The Unblocked Polyisocyanate Crosslinking Agent

Polyisocyanate crosslinking agents are generally well known in the art and have been extensively used in coating compositions in a monomeric, oligomeric and/or polymeric form. To function as an effective crosslinking agent, the polyisocyanate must have at least two reactive isocyanate groups.

As suitable polyisocyanate crosslinking agents for use in the present invention may be mentioned any liquid or solid organic polyisocyanate containing at least two reactive isocyanate groups. In addition, such polyisocyanate crosslinking agents should in and of themselves be substantially hydrophobic and non-dispersible in water. Suitable polyisocyanate crosslinking agents may contain aliphatically, cycloaliphatically, araliphatically and/or aromatically bound isocyanate groups. Mixtures of polyisocyanates are also suitable. Particularly preferred are those polyisocyanates containing aliphatically, cycloaliphatically and/or araliphatically bound polyisocyanates including, but not limited to, the following specific examples:

hexamethylene diisocyanate;

2,2,4-trimethylhexamethylene diisocyanate;

2,4,4-trimethylhexamethylene diisocyanate;

meta-$\alpha,\alpha,\alpha',\alpha'$-tetramethylxylylenediisocyanate (commercially available under the trade designation m-TMXDI® aliphatic isocyanate from Cytec Industries Incorporated, West Paterson, N.J.);

para-$\alpha,\alpha,\alpha',\alpha'$-tetramethylxylylenediisocyanate (available under the trade designation p-TMXDI® aliphatic isocyanate from Cytec Industries Incorporated, West Paterson, N.J.);

1-isocyanato-3,3,5-trimethyl-5-isocyanatomethyl cyclohexane (isophorone diisocyanate, abbreviated as IPDI);

bis(4-isocyanatocyclohexyl)methane (hydrogenated MDI);

biuret derivatives of various diisocyanates including, for example, hexamethylene diisocyanate (commercially available under the trade designation Desmodur® N of Miles Inc., Pittsburgh, Pa.);

uretdione derivatives of various diisocyanates including, for example, hexamethylene diisocyanate and IPDI;

isocyanurate derivatives of various diisocyanates including, for example, hexamethylene diisocyanate (commercially available under the trade designation Desmodur® N 3390 of Miles Inc., Pittsburgh, Pa.) and IPDI (commercially available under the trade designation IPDI® T 1890 polyisocyanate of Huls America, Inc., Piscataway, N.J.); and urethane adducts of diisocyanates with polyols such as, for example, ethylene glycol, propylene glycol, neopentyl glycol, trimethylolpropane, pentaerythritol and the like, as well as oligomeric and polymeric polyols.

The preferred polyisocyanate crosslinking agents are those having at least one non-primary isocyanate group. Also preferred are the urethane diisocyanate/polyol adducts, more preferably those having an NCO content of at least 10 wt % (on a 100% solids basis), and especially those wherein the diisocyanate contains at least one non-primary isocyanate group. Particularly preferred are such urethane adducts having an average NCO functionality of greater than 2, and especially the diisocyanate/trimethylolpropane adducts. An especially preferred example of such is the 3:1 meta-α,α, α',α'-tetramethylxylylenediisocyanate/trimethylolpropane adduct commercially available under the trade designation CYTHANE® 3160 aliphatic polyisocyanate of Cytec Industries Incorporated, West Paterson, N.J., which has the following properties:

| | |
|---|---|
| Non-Volatiles (% by wt) | 80 |
| NCO Content (% by wt on Solution) | 11 |
| Solvent (1:1) | Butyl Acetate/Methyl Ethyl Ketone |
| Viscosity, 25° C. (mPa @ 80%) | 12,000–15,000 |

Another example of a diisocyanate/trimethylolpropane adduct is a 3:1 IPDI/trimethylolpropane adduct commercially available under the trade designation SPENLITE® P 25-A4-60 aliphatic urethane prepolymer of Reichhold Chemicals, Research Triangle Park, N.C.

The Surface Active Isocyanate Reactive Material

The surface active isocyanate reactive material contains both (i) functionality capable of reacting with isocyanate groups, as well as (ii) hydrophilizing functionality capable of rendering the surface active isocyanate reactive material water dipersible. In this manner, in the curable emulsions the reactive material acts as a surfactant for emulsifying the isocyanate crosslinkers, and in the final film the surface active material is incorporated into the crosslinked network by virtue of its reactivity with the isocyanate crosslinkers, leading to improved water resistance.

The preferred surface active isocyanate reactive material is polymeric in nature, with the hydrophilizing groups and isocyanate reactive functionality being incorporated into the polymer via appropriate monomer selection or subsequent modification. As examples of such may be mentioned olefinic copolymers based on carboxyfunctional ethylenically unsaturated monomers and hydroxyfunctional ethylenically unsaturated monomers; polyesters based on polybasic carboxylic acids and polyhydric alcohols; polyurethanes based on polyisocyanates, polyhydric alcohols and hydroxy acids; polyepoxy esters; and the like. Especially preferred for use in the present invention are the olefinic copolymers.

Isocyanate reactive functionality, as utilized herein, refers to functionality which is reactive with isocyanate groups under cure conditions of the curable emulsions. Such isocyanate reactive functionality is generally well known to those skilled in the coatings art and includes, most commonly, active hydrogen containing functionality such as hydroxyl and amino groups. Hydroxyl is typically utilized as the isocyanate reactive functionality in coatings and is preferred for use in the present invention.

Hydrophilizing functionality is also generally well known to those skilled in the coatings art and includes, most commonly, anion generating, cation generating and hydrophilic non-ionic functionality. By anion generating and cation generating is meant functionality such as carboxyl (anion generating) or amino (cation generating) which, when appropriately neutralized, becomes hydrophilic in nature. Hydrophilic non-ionic functionality is, in and of itself, hydrophilic in nature. The amount of hydrophilizing functionality present in the isocyanate reactive material should, upon at least partial neutralization of the anion generating or cation generating groups (if present), be sufficient to render the isocyanate reactive material water-dispersible.

Besides the aforementioned carboxyl groups, other examples of suitable groups which generate anions upon neutralization include sulfonic and phosphoric groups. Besides the aforementioned amino groups (substituted and unsubstituted), other examples of suitable groups which generate cations upon neutralization may be mentioned substituted and unsubstituted sulphonate groups, and substituted and unsubstituted phosphite groups. As examples of suitable hydrophilic non-ionic functionality may be mentioned amine oxide, phosphine oxide, alkyl or aryl phosphate, and polyether (polyethylene oxide).

Preferred hydrophilizing groups for most applications are those which generate anions upon neutralization and, particularly, the carboxyl and sulfonic groups. Especially preferred are carboxyl groups.

When coating compositions are formulated from the emulsifiable compositions of the present invention, it is especially preferred that the polyisocyanate crosslinker and the surface active isocyanate reactive material comprise the primary film-forming components of the coating. In such a case, the surface active isocyanate reactive material should possess the following characteristics:

a number average molecular weight (Mn) of from about 1000 to about 50000, and preferably from about 1000 to about 12000;

an acid number of from about 15 to about 150 mg KOH/g resin, preferably from about 20 to about 70 mg KOH/g resin, and especially from about 20 to about 35 mg KOH/g resin; and an amount of hydroxyl groups of from about 2.5 wt % to about 6 wt %, preferably from about 3 wt % to about 5 wt %, and especially from about 3.5% to about 4.5 wt % (100% solids basis).

In addition, for ambient cure systems the surface active isocyanate reactive material should have a low glass transition temperature (Tg), preferably below 0° C.

Particularly preferred surface active isocyanate reactive materials comprise copolymers of (meth)acrylic acid, hydroxyalkyl (meth)acrylates and, optionally, other free-radically polymerizable monomers which, when polymerized, meet the above characteristics. As exemplified by the previously incorporated references, production of such copolymers is well-known to those skilled in the relevant art and need not be discussed further.

It should be noted that, for applications such as electrodeposition, the common hydrophilizing functionality is cation generating. Especially preferred in this case are amino groups, and similar constraints to those set forth above (with the exception of acid number being exchanged for amine equivalency) would apply to the surface active isocyanate reactive materials utilized in forming curable emulsions for this application.

Although the polyisocyanate crosslinker and the surface active isocyanate reactive material can be present in the emulsifiable compositions in varying amounts, when these components comprise the primary film-forming components of a subsequently formed coating, it is preferred that they be present in the emulsifiable compositions in amounts such that the NCO:NCO reactive functionality ratio is in the range of from about 0.5:1 to about 2:1, and especially in the range of from about 0.8:1 to about 1.2:1.

Optional Ingredients

As indicated earlier, the emulsifiable compositions may also comprise additional ingredients such as, for example, neutralizing agents for rendering the surface active isocyanate material water-dispersible, cure catalysts and relatively minor amounts of an organic solvent.

When an anion generating group is present on the isocyanate reactive material, any base may be used as the neutralizing agent to produce an anionic surface active material. Normally, a base capable of converting a carboxyl group to a carboxylate anion is used as the neutralizing agent, including organic and inorganic bases such as sodium and potassium hydroxide, sodium and potassium carbonate, and amines such as ammonia, primary, secondary and tertiary amines. Tertiary amines and ammonia are preferred.

Similarly, when a cation generating group is present on the isocyanate reactive material, any acid may be used as the neutralizing agent to produce a cationic surface active material.

As discussed in further detail below, when utilized the neutralizing agents may be present in the emulsifiable composition, the aqueous medium into which the emulsifiable composition is emulsified or both. In any case, the total amount of neutralizing agent must at least be sufficient to render the surface active isocyanate reactive material water dispersible.

Cure catalysts for isocyanates are well known to those skilled in the relevant coatings art. Preferred are organometallic catalysts and, particularly, organotin compounds such as dibutyltin di-2-ethylhexoate, dibutyltin diisooctyl maleate, dibenzyltin di-2-ethylhexoate, dibutyltin dilaurate, dimethyltin dilaurate, tetrabutyl diacetoxy distannoxane, tetramethyldiacetoxydistannoxane, tetrapropyldiacetoxydistannoxane, dibutyltin dichloride, and the like.

The organic solvents present in the emulsifiable compositions are generally those present in the various components. For example, many coatings components are not commercially available on a 100% solids basis but are rather a somewhat lower solids content in an appropriate solvent. Preferably, no other organic solvent is or need be added to the emulsifiable compositions (or emulsions) to achieve acceptable results.

Depending on their end use, the emulsifiable compositions of the present invention may also comprise other well known auxiliaries and additives typically utilized in the coatings industry including, for example, foam inhibitors, levelling aids, pigments, pigment dispersing aids, dyes, UV absorbers and other stabilizing additives, and the like. These other additives are well known to those skilled in the relevant art and need not be discussed further.

Process for Preparing the Curable Emulsions and the Curable Emulsions So Prepared As mentioned above, the substantially homogeneous, curable, oil-in-water emulsions in accordance with the present invention are produced by the steps of:

(a) admixing the components of the non-aqueous emulsifiable composition as described above; and thereafter (b) contacting such emulsifiable composition and an aqueous medium in proportions and under conditions so as to result in a substantially homogeneous, oil-in-water emulsion.

As is evident, a key aspect to obtaining improved results is to first prepare the emulsifiable composition, then to subsequently mix the emulsifiable composition and the aqueous medium so as to result in a substantially homogenous oil-in-water emulsion. The emulsions can be prepared by any number of well known techniques, but are preferably prepared by adding the aqueous medium, either continuously or in portions, to the emulsifiable composition under mixing conditions until phase inversion occurs. Additional aqueous medium can then be added to adjust the emulsions to the desired solids content and viscosity.

In the aforementioned procedure, the neutralizing agent (if utilized) may comprise a portion of the emulsifiable composition (preneutralization of the surface active isocyanate reactive material) and/or a portion of the aqueous medium (neutralization during emulsification). In either case, sufficient neutralizing agent should be present in total in order to render the surface active isocyanate reactive material water-dispersible.

The aqueous medium may comprise solely water or may, as indicated above, comprises other components such as the neutralizing agent. Other than the neutralizing agent, the aqueous medium may also include any one of a number of other auxiliaries and additives common to the end use, as well as minor amounts of water-miscible organic solvents to ease emulsification or adjust viscosity, although this is not preferred. It is preferred that any such additional ingredients be incorporated into the emulsifiable compositions; in other words, it is preferred that the aqueous medium comprise solely water, or comprise water and a neutralizing agent.

Via the above procedure, substantially homogenous, curable, oil-in-water emulsions can be produced which may find use in a variety of fields including, for example, coatings and adhesives applications. Without being bound by any structure or theory, it is believed that the superior properties of such emulsions and films from such emulsions are the direct result of a unique microstructure in the emulsion achievable via the order of addition described above.

Coating Compositions

A primary utility of the curable emulsions of the present invention is in the coatings industry, for example, in automotive original equipment manufacturing (OEM), industrial maintenance, electrodeposition and, particularly, ambient temperature cure automotive refinish applications. It is also usable in architectural, coil, can, plastic and wood coating applications. The curable emulsion may be utilized in clearcoat applications, or may contain a pigment for other applications.

An especially preferred application for the curable emulsions of the present invention is as an ambient temperature cure, automotive refinish clearcoat.

Coatings obtained from the curable emulsions of the present invention may be applied to a variety of substrates in any desirable manner, such as by roller coating, spraying, brushing, sprinkling, flow coating, dipping, electrostatic spraying and electrophoresis. Depending on the ultimate end use, coatings may be formulated as ambient or elevated temperature cure systems. For example, for refinish coatings applications the coatings will be formulated for ambient cure, whereas for automotive original equipment manufacturing (OEM) applications the coatings will be formulated for cure at elevated temperatures of, typically, 125° C.

The foregoing more general discussion of the invention will be further exemplified by the following specific examples offered by way of illustration and not limitation of the above-described invention.

EXAMPLES

Example 1

Production of Surface Active Isocyanate Reactive Material

Urethane grade propylene glycol monomethyl ether acetate (655 g) was added to a 5 liter reactor equipped with a stirrer, a reflux condenser, and a thermocouple under a blanket of nitrogen and heated in an oil bath to 90° C. A monomer feed mixture (1725 g total) consisting of butyl acrylate (48.38 wt %), 2-hydroxyethyl acrylate (21.07 wt %), methyl methacrylate (20.46 wt %), acrylic acid (6.16 wt %), 2,2'-azobis-2-methylbutyronitrile (2.97 wt %), and 1-octanethiol (0.96 wt %) was added to the reactor using a piston metering pump over a period of 235 minutes. During this period, the temperature of the reaction mixture reached a maximum of 101° C. After an additional 40 minutes, 10.3 g of a 20 wt % solution of 2,2'-azobis-2-methylbutyronitrile in urethane grade propylene glycol monomethyl ether acetate was charged and the reaction mixture was stirred at a temperature of 92° C. to 98° C. for an additional 86 minutes to produce a carboxyfunctional isocyanate reactive material as the reaction product. The solids content of the product was 72.0 wt % by the pan solids method (heating 1.00 g of sample in an aluminum dish at 105° C. for 1 hour). The material had an acid number of 28 mg KOH/g resin (by titration). The amount of hydroxyl groups, after correcting for the acidity of the product, was 3.5 wt % (100% solids basis). By High Pressure Size Exclusion Chromatography (HPSEC), the number averaged molecular weight of the product was 7,200 relative to a polystyrene standard, with a polydispersity of 2.5.

Production of Curable Emulsion A

To 6.8 g of the surface active isocyanate reactive material produced above were added, under stirring, the following components in the listed order to produce an emulsifiable composition:

0.25 g triethylamine, 0.41 g of a 10 wt % solution of dibutyltin dilaurate in urethane grade propylene glycol monomethyl ether acetate, and 4.0 g of CYTHANE® 3160 aliphatic polyisocyanate resin (80 wt % solids in a mixture of 1:1 methyl ethyl ketone/normal butyl acetate).

To this emulsifiable composition were added, at room temperature, eight portions of water (15.5 g total), with the resulting mixture being stirred after each addition to give a substantially homogeneous oil-in-water curable emulsion. Curable Emulsion A contained 30 wt % of non-volatiles and an NCO/OH equivalent ratio of 1:1. Volatile organic compounds (VOC) were present at a level not more than 1.0 lb/gal.

Curable Emulsion A displayed an opalescent appearance, bluish tint and uniform consistency, and had a gel time of more than 8 hours.

Production of Curable Emulsions B, C and D

Curable Emulsions B, C and D were produced in a manner identical to Curable Emulsion A with the ingredients listed below. The NCO/OH equivalent ratio of each was 1:1.

| CURABLE EMULSION: | B | C | D |
|---|---|---|---|
| Surface Active Material (g) | 6.8 | 6.8 | 6.8 |
| Triethylamine (g) | 0.25 | 0.25 | 0.25 |
| 10% Dibutyltin Dilaurate solution in propyleneglycol monomethyl ether acetate (g) | 0.42 | 0.37 | — |
| 1% Dibutyltin Dilaurate solution in propyleneglycol monomethyl ether acetate (g) | — | — | 0.14 |
| Polyisocyanate (g) | | | |
| SPENLITE ® P25-A4-60 | 5.7 | — | — |
| IPDI ® T1890 | — | 3.5 | — |
| DESMODUR ® N 3390 | — | — | 2.2 |
| Water (g) (Added Last) | 14.5 | 13.8 | 13.6 |
| GEL TIME (Hours) | 8+ | 2.5 | 4.0 |
| APPEARANCE | Milky | Milky | Milky |
| TINT | Bluish | — | — |
| CONSISTENCY | Uniform | Uniform | Slightly Gritty |

Drawdowns of Curable Emulsions A-D were made on BONDERITE® 100 ED-11 primed steel panels, a product of Advanced Coating Technologies, Southfield, Mich., using a #52 wire cator applicator. Wet films of 100 to 300 μm thickness corresponding to a dry film thickness 25 to 75 μm were obtained. The films were cured either at room temperature (TABLE 1, COATINGS E, F, G and H) or at a super ambient temperature (TABLE 2, COATINGS I, J and K) as indicated below to produce high gloss coatings.

Appearance, film properties, and resistance properties of the coatings are summarized in TABLE 1 and TABLE 2.

TABLE 1

| PROPERTIES OF ROOM TEMPERATURE CURED COATINGS | | | | |
|---|---|---|---|---|
| COATING | E | F | G | H |
| Curable Emulsion | A | B | C | D |
| Film Thickness (mils) | 1.1 | 1.2 | 1.1 | 1.3 |

TABLE 1-continued

PROPERTIES OF ROOM TEMPERATURE CURED COATINGS

| COATING | E | F | G | H |
|---|---|---|---|---|
| Film Thickness (mm) | 0.028 | 0.030 | 0.028 | 0.033 |
| NCO/OH Ratio | 1:1 | 1:1 | 1:1 | 1:1 |
| AFTER 3 DAYS AT 25° C. | | | | |
| Knoop Hardness | 3.9 | 8.8 | 5.1 | 1.3 |
| MEK Rubs (Mar/Remove) | 180/200+ | 200+ | 200+ | 200+ |
| NCO Reacted (%) | 53 | 59 | 49 | 82 |
| AFTER 7 DAYS AT 25° C. | | | | |
| Knoop Hardness | 7.1 | 10.3 | 7.7 | 1.5 |
| MEK Double Rubs | 200+ | 200+ | 200+ | 200+ |
| NCO Reacted (%) | 73 | 70 | 63 | 89 |
| FILM APPEARANCE | Clear No Blisters No Pinholes | Clear Blisters Pinholes | Clear Blisters Pinholes | Clear Blisters Pinholes |
| HUMIDITY RESISTANCE (60° C.) | >30 Days | — | — | — |
| WATER IMMERSION (60° C.) | | | | |
| Pencil Hardness (Initial) | F–H | — | — | — |
| Pencil Hardness (24 Hours) | F–H | — | — | — |
| ACID/BASE RESISTANCE | | | | |
| 10% Sulfuric Acid (6 Hours) | No Effect | — | — | — |
| 5% Sodium Hydroxide (24 Hours) | No Effect | — | — | — |
| DRY TIME | | | | |
| Tack-Free (Hours) | 1.0–1.5 | — | — | — |
| Through Dry (Hours) | 3.25–3.5 | — | — | — |

TABLE 2

PROPERTIES OF SUPERAMBIENT TEMPERATURES CURED COATINGS FROM CURABLE EMULSION A

| Film Thickness (mils) | 1.4 | | |
|---|---|---|---|
| Film Thickness (mm) | 0.036 | | |
| NCO/OH Ratio | 1:1 | | |
| COATINGS | I | J | K |
| Cure | 30 MIN./ 120° C. | 30 MIN./ 60° C. | 30 MIN./60° C. Followed by 7 Days at Room Temp. |
| Knoop Hardness | 14.8 | 3 | 11.5 |
| MEK Rubs (Mar/Remove) | 200+ | 160/200+ | 200+ |

Example 2

Curable Emulsion L was prepared in a manner and with ingredients identical to Emulsion A, except that the water and triethylamine were combined first, then added to a mixture of the remaining ingredients. The NCO/OH equivalent ratio was 1:1.

A drawdown of Curable Emulsion L was prepared in accordance with the procedure set forth in Example 1, and the film obtained was cured for 10 days at room temperature to a film thickness of 1.5 mils (0.038 mm). The resulting dried film was clear with no grit, blisters or pinholes, possessed a Knoop Hardness of 5.0, and withstood 200+ MEK double rubs.

Comparative Example 1

A surface active isocyanate reactive material was produced in an identical manner to that set forth in EXAMPLE 1 except that the solvent used was butyl acetate. This material was dispersed in a water/ammonia solution by following the procedure disclosed in column 8, lines 27 to 40 of the previously incorporated U.S. Pat. No. 5,075,370. The butyl acetate was removed by adding the hydroxyfunctional material to water and azeotroping the volatiles. Occasionally, an amount of water equal to the amount of water azeotroped was added back into the mixture. The azeotroping procedure was repeated until all the butyl acetate was removed. The pH of the remainder was 7, so it was not necessary to add additional ammonia solution. The resulting aqueous product had a solids level of 25.8%.

In the manner taught by U.S. Pat. No. 5,075,370, an attempt was made to prepare a curable emulsion by adding the ingredients in the amounts shown below:

| (1) | Aqueous Product (g) | 20.5 |
|---|---|---|
| (2) | Water (g) | 3.38 |
| (3) | 10% Dibutyltin Dilaurate solution in propyleneglycol monomethyl ether acetate | 0.42 |
| (4) | CYTHANE ® 3160 (80% Solids) (g) | 4.0 |

The above aqueous product and additional water were combined first and, thereafter, the polyisocyanate ingredient and the cure catalyst were added. The NCO/OH equivalent ratio was 1:1 and the level of the non-volatiles was 30 weight %.

An attempt was made to admix the above ingredients by hand-stirring and also by using a high shear air stirrer. Both methods, however, produced a milky-white two phase system with an appreciable amount of grit. When the stirring was stopped, two distinct layers were obtained. Because of the two phase nature of the formulation, it was not possible to make a drawdown thereof.

Comparative Example 2

The water dispersed carboxyfunctional material "G" was prepared by repeating the procedure disclosed in column 8, lines 8 to 40 of the previously incorporated U.S. Pat. No. 5,075,370. The aqueous product obtained in this manner had a solids level of 24.2%.

In the manner taught by U.S. Pat. No. 5,075,370, an attempt was made to prepare a curable emulsion by adding the ingredients in the amounts shown below:

| (1) | Aqueous Product (g) | 14.5 |
|---|---|---|
| (2) | Water (g) | 3.5 |
| (3) | DESMODUR ® N3390 polyisocyanate (50% solids in Solvesso 100) (g) | 4.0 |

The aqueous product and additional water were combined first and, thereafter, the polyisocyanate ingredient was added. The NCO/OH equivalent ratio was 1:1 and the level of the non-volatiles was 25 weight %.

While the resulting emulsion (EMULSION M) did not gel, it was a non-uniform and unstable emulsion which gave a heavy precipitate on standing 1 to 2 hours at room temperature.

Two drawdowns of Emulsion M were prepared as in Example 1 and cured as set forth in Table 3. Appearance, film properties and resistance properties of the resulting films are summarized in TABLE 3.

TABLE 3

PROPERTIES OF FILMS PREPARED ACCORDING TO US5075370

| | | |
|---|---|---|
| Film Thickness (mils) | 1.40 | |
| Film Thickness (mm) | 0.025 | |
| NCO/OH Ratio | 1:1 | |
| COATINGS | N | O |
| Cure | 9 Days at Room Temp. | 30 Min./125° C. |
| Film Appearance | Hazy Microblisters | Hazy Microblisters |
| MEK Rubs (Mar/Remove) | 200+ | 200+ |
| Gloss | | |
| 60° | 14 | 4 |
| 20° | 3 | 1 |

As can be seen from the results of Comparative Examples 1 and 2, neither acceptable emulsions nor films could be achieved by following the disclosure of U.S. Pat. No. 5,075,370.

Although the present invention is described with reference to certain preferred embodiments, it is apparent that variations or modifications thereof may be made by those skilled in the art without departing from the scope of this invention as defined by the appended claims.

We claim:

1. An oil-in-water emulsion comprising an aqueous medium having substantially homogeneously emulsified therein a non-aqueous substantially homogeneous emulsifiable composition comprising a mixture of:
   (1) an unblocked polyisocyanate crosslinking agent containing at least two reactive isocyanate groups, at least one of which is a non-primary isocyanate group, and which in and of itself is substantially hydrophobic and non-dispersible in water; and
   (2) a surface active isocyanate reactive material.

2. The oil-in-water emulsion of claim 1, wherein the unblocked polyisocyanate crosslinking agent comprises a urethane adduct of a diisocyanate containing at least one non-primary isocyanate group with a polyol.

3. The oil-in-water emulsion of claim 2, wherein the polyol is trimethylolpropane.

4. The oil-in-water emulsion of claim 2, wherein the diisocyanate is meta-α,α,α',α'-tetramethylxylylenediisocyanate.

5. The oil-in-water emulsion of claim 3, wherein the diisocyanate is meta-α,α,α',α'-tetramethylxylylenediisocyanate.

6. The oil-in-water emulsion of claim 1, wherein the unblocked polyisocyanate crosslinking agent has an NCO content of at least 10 weight % (on a 100% solids basis), and an average NCO functionality of greater than two.

7. The oil-in-water emulsion of claim 1, wherein the surface active isocyanate reactive material contains isocyanate reactive functionality, hydrophilizing functionality and is polymeric in nature.

8. The oil-in-water emulsion of claim 7, wherein the isocyanate reactive functionality comprises hydroxyl groups.

9. The oil-in-water emulsion of claim 7, wherein the hydrophilizing functionality is selected from anion generating functionality and cation generating functionality.

10. The oil-in-water emulsion of claim 9, further comprising a neutralizing agent for the hydrophilizing functionality in an amount sufficient to render the surface active isocyanate reactive material water-dispersible.

11. The oil-in-water emulsion of claim 9, wherein the hydrophilizing functionality is amino.

12. The oil-in-water emulsion of claim 9, wherein the hydrophilizing functionality is carboxyl.

13. The oil-in-water emulsion of claim 7, wherein the surface active isocyanate reactive material possesses the following characteristics:
   a number averaged molecular weight of from about 1000 to about 50000,
   an acid number of from about 15 to about 150 mg KOH/g resin, and
   an amount of hydroxyl groups of from about 2.5 wt % to about 6 wt % (on a 100% solids basis).

14. The oil-in-water emulsion of claim 7, wherein the surface active isocyanate reactive material is selected from the group consisting of olefinic copolymers and polyesters.

15. The oil-in-water emulsion of claim 1, wherein the unblocked polyisocyanate crosslinking agent and the surface active isocyanate reactive material are present in amounts such that isocyanate:isocyanate reactive functionality ratio is in the range of from about 0.5:1 to about 2:1.

16. The oil-in-water emulsion of claim 1, wherein the unblocked polyisocyanate crosslinking agent and the surface active isocyanate reactive material are present in amounts such that isocyanate:isocyanate reactive functionality ratio is in the range of from about 0.8:1 to about 1.2:1.

17. The oil-in-water emulsion of claim 1, wherein:
   (1) the unblocked polyisocyanate crosslinking agent is a urethane adduct of a diisocyanate containing at least one non-primary isocyanate group with a polyol, has an NCO content of at least 10 weight % (on a 100% solids basis), and has an average NCO functionality of greater than two; and
   (2) the surface active isocyanate reactive material contains hydroxyl groups, further contains anion generating functionality which is neutralized in an amount sufficient to render the surface active isocyanate reactive material water-dispersible, and is selected from the group consisting of olefinic copolymers and polyesters, the unblocked polyisocyanate crosslinking agent and the surface active isocyanate reactive material being present in amounts such that isocyanate:isocyanate reactive functionality ratio is in the range of from about 0.8:1 to about 1.2:1.

18. The oil-in-water emulsion of claim 17, wherein the polyol is trimethylolpropane.

19. The oil-in-water emulsion of claim 18, wherein the diisocyanate is meta-α,α,α',α'-tetramethylxylylenediisocyanate.

20. A method of producing a substantially homogenous oil-in-water emulsion comprising the steps of:
   (a) admixing (1) an unblocked polyisocyanate crosslinking agent containing at least two reactive isocyanate groups, at least one of which is a non-primary isocyanate group, and which in and of itself is substantially hydrophobic and non-dispersible in water, and (2) a surface active isocyanate reactive material, to produce a non-aqueous, substantially homogenous, emulsifiable composition; and thereafter
   (b) contacting the emulsifiable composition and an aqueous medium in proportions and under conditions so as to result in a substantially homogenous, oil-in-water emulsion.

21. The method of claim 20, wherein the unblocked polyisocyanate crosslinking agent comprises a urethane adduct of a diisocyanate containing at least one non-primary isocyanate group with a polyol.

22. The method of claim 21, wherein the polyol is trimethylolpropane.

23. The method of claim 21, wherein the diisocyanate is meta-α,α,α',α'-tetramethylxylylenediisocyanate.

24. The method of claim 23, wherein the diisocyanate is meta-α,α,α',α -tetramethylxylylenediisocyanate.

25. The method of claim 20, wherein the unblocked polyisocyanate crosslinking agent has an NCO content of at least 10 weight % (on a 100% solids basis), and an average NCO functionality of greater than two.

26. The method of claim 20, wherein the surface active isocyanate reactive material contains isocyanate reactive functionality, hydrophilizing functionality and is polymeric in nature.

27. The method of claim 26, wherein the isocyanate reactive functionality comprises hydroxyl groups.

28. The method of claim 26, wherein the hydrophilizing functionality is selected from anion generating functionality and cation generating functionality.

29. The method of claim 28, wherein the emulsifiable composition further comprises a neutralizing agent for the hydrophilizing functionality in an amount sufficient to render the surface active isocyanate reactive material water-dispersible.

30. The method of claim 28, wherein the aqueous medium contains a neutralizing agent for the hydrophilizing functionality in an amount sufficient to render the surface active isocyanate reactive material water-dispersible.

31. The method of claim 26, wherein the hydrophilizing functionality is amino.

32. The method of claim 26, wherein the hydrophilizing functionality is carboxyl.

33. The method of claim 26, wherein the surface active isocyanate reactive material possesses the following characteristics:
   a number averaged molecular weight of from about 1000 to about 50000,
   an acid number of from about 15 to about 150 mg KOH/g resin, and
   an amount of hydroxyl groups of from about 2.5 wt % to about 6 wt % (on a 100% solids basis).

34. The method of claim 26, wherein the surface active isocyanate reactive material is selected from the group consisting of olefinic copolymers and polyesters.

35. The method of claim 20, wherein the unblocked polyisocyanate crosslinking agent and the surface active isocyanate reactive material are present in amounts such that isocyanate:isocyanate reactive functionality ratio is in the range of from about 0.5:1 to about 2:1.

36. The method of claim 20, wherein the unblocked polyisocyanate crosslinking agent and the surface active isocyanate reactive material are present in amounts such that isocyanate:isocyanate reactive functionality ratio is in the range of from about 0.8:1 to about 1.2:1.

37. The method of claim 20, wherein:
   (1) the unblocked polyisocyanate crosslinking agent is a urethane adduct of a diisocyanate containing at least one non-primary isocyanate group with a polyol, has an NCO content of at least 10 weight % (on a 100% solids basis), and has an average NCO functionality of greater than two; and
   (2) the surface active isocyanate reactive material contains hydroxyl groups, further contains anion generating functionality which is neutralized in an amount sufficient to render the surface active isocyanate reactive material water-dispersible, and is selected from the group consisting of olefinic copolymers and polyesters, the unblocked polyisocyanate crosslinking agent and the surface active isocyanate reactive material being present in amounts such that isocyanate:isocyanate reactive functionality ratio is in the range of from about 0.8:1 to about 1.2:1.

38. The method of claim 37, wherein the polyol is trimethylolpropane.

39. The method of claim 38, wherein the diisocyanate is meta-α,α,α',α'-tetramethylxylylenediisocyanate.

40. A coating composition based on an oil-in-water emulsion comprising an aqueous medium having substantially homogeneously emulsified therein a film-forming, non-aqueous substantially homogeneous emulsifiable composition comprising, as the primary film-forming components, a mixture of:
   (1) an unblocked polyisocyanate crosslinking agent containing at least two reactive isocyanate groups, at least one of which is a non-primary isocyanate group, and which in and of itself is substantially hydrophobic and non-dispersible in water; and
   (2) a surface active isocyanate reactive material.

41. The coating composition of claim 40, wherein the unblocked polyisocyanate crosslinking agent comprises a urethane adduct of a diisocyanate containing at least one non-primary isocyanate group with a polyol.

42. The coating composition of claim 41, wherein the polyol is trimethylolpropane.

43. The coating composition of claim 41, wherein the diisocyanate is meta-α,α,α',α'-tetramethylxylylenediisocyanate.

44. The coating composition of claim 42, wherein the diisocyanate is meta-α,α,α',α'-tetramethylxylylenediisocyanate.

45. The coating composition of claim 40, wherein the unblocked polyisocyanate crosslinking agent has an NCO content of at least 10 weight % (on a 100% solids basis), and an average NCO functionality of greater than two.

46. The coating composition of claim 40, wherein the surface active isocyanate reactive material contains isocyanate reactive functionality, hydrophilizing functionality and is polymeric in nature.

47. The coating composition of claim 46, wherein the isocyanate reactive functionality comprises hydroxyl groups.

48. The coating composition of claim 46, wherein the hydrophilizing functionality is selected from anion generating functionality and cation generating functionality.

49. The coating composition of claim 48, further comprising a neutralizing agent for the hydrophilizing functionality in an amount sufficient to render the surface active isocyanate reactive mater water-dispersible.

50. The coating composition of claim 48, wherein the hydrophilizing functionality is amino.

51. The coating composition of claim 48, wherein the hydrophilizing functionality is carboxyl.

52. The coating composition of claim 46, wherein the surface active isocyanate reactive material possesses the following characteristics:

a number averaged molecular weight of from about 1000 to about 50000, an acid number of from about 15 to about 150 mg KOH/g resin, and an amount of hydroxyl groups of from about 2.5 wt % to about 6 wt % (on a 100% solids basis).

53. The coating composition of claim 46, wherein the surface active isocyanate reactive material is selected from the group consisting of olefinic copolymers and polyesters.

54. The coating composition of claim 40, wherein the unblocked polyisocyanate crosslinking agent and the surface active isocyanate reactive material are present in amounts such that isocyanate:isocyanate reactive functionality ratio is in the range of from about 0.5:1 to about 2:1.

55. The coating composition of claim 40, wherein the unblocked polyisocyanate crosslinking agent and the surface active isocyanate reactive material are present in amounts such that isocyanate:isocyanate reactive functionality ratio is in the range of from about 0.8:1 to about 1.2:1.

56. The coating composition of claim 40, further comprising a cure catalyst.

57. The coating composition of claim 40, comprising no cure catalyst.

58. The coating composition of claim 40, wherein:

(1) the unblocked polyisocyanate crosslinking agent is a urethane adduct of a diisocyanate containing at least one non-primary isocyanate group with a polyol, has an NCO content of at least 10 weight % (on a 100% solids basis), and has an average NCO functionality of greater than two; and (2) the surface active isocyanate reactive material contains hydroxyl groups, further contains anion generating functionality which is neutralized in an amount sufficient to render the surface active isocyanate reactive material water-dispersible, and is selected from the group consisting of olefinic copolymers and polyesters, the unblocked polyisocyanate crosslinking agent and the surface active isocyanate reactive material being present in amounts such that isocyanate:isocyanate reactive functionality ratio is in the range of from about 0.8:1 to about 1.2:1.

59. The coating composition of claim 58, wherein the polyol is trimethylolpropane.

60. The coating composition of claim 59, wherein the diisocyanate is meta-α,α,α',α'-tetramethylxylylenediisocyanate.

61. An ambient temperature curable, automotive refinish clearcoat based on an oil-in-water emulsion comprising an aqueous medium having substantially homogeneously emulsified therein a film-forming, non-aqueous substantially homogeneous emulsifiable composition comprising, as the primary film-forming components, a mixture of:

(1) an unblocked polyisocyanate crosslinking agent containing at least two reactive isocyanate groups, at least one of which is a non-primary isocyanate group, and which in and of itself is substantially hydrophobic and non-dispersible in water; and (2) a surface active isocyanate reactive material.

62. The clearcoat of claim 61, wherein the unblocked polyisocyanate crosslinking agent comprises a urethane adduct of a diisocyanate containing at least one non-primary isocyanate group with a polyol.

63. The clearcoat of claim 62, wherein the polyol is trimethylolpropane.

64. The clearcoat of claim 62, wherein the diisocyanate is meta-α,α,α',α'-tetramethylxylylenediisocyanate.

65. The clearcoat of claim 63, wherein the diisocyanate is meta-α,α,α',α'-tetramethylxylylenediisocyanate.

66. The clearcoat of claim 61, wherein the unblocked polyisocyanate crosslinking agent has an NCO content of at least 10 weight % (on a 100% solids basis), and an average NCO functionality of greater than two.

67. The clearcoat of claim 61, wherein the surface active isocyanate reactive material contains isocyanate reactive functionality, hydrophilizing functionality and is polymeric in nature.

68. The clearcoat of claim 67, wherein the isocyanate reactive functionality comprises hydroxyl groups.

69. The clearcoat of claim 67, wherein the hydrophilizing functionality is anion generating functionality.

70. The clearcoat of claim 69, further comprising a neutralizing agent for the hydrophilizing functionality in an amount sufficient to render the surface active isocyanate reactive mater water-dispersible.

71. The clearcoat of claim 69, wherein the hydrophilizing functionality is carboxyl.

72. The clearcoat of claim 67, wherein the surface active isocyanate reactive material possesses the following characteristics:

a number averaged molecular weight of from about 1000 to about 50000, an acid number of from about 15 to about 150 mg KOH/g resin, and an amount of hydroxyl groups of from about 2.5 wt % to about 6 wt % (on a 100% solids basis).

73. The clearcoat of claim 67, wherein the surface active isocyanate reactive material is selected from the group consisting of olefinic copolymers and polyesters.

74. The clearcoat of claim 61, wherein the unblocked polyisocyanate crosslinking agent and the surface active isocyanate reactive material are present in amounts such that isocyanate:isocyanate reactive functionality ratio is in the range of from about 0.5:1 to about 2:1.

75. The clearcoat of claim 61, wherein the unblocked polyisocyanate crosslinking agent and the surface active isocyanate reactive material are present in amounts such that isocyanate:isocyanate reactive functionality ratio is in the range of from about 0.8:1 to about 1.2:1.

76. The clearcoat of claim 61, further comprising a cure catalyst.

77. The clearcoat of claim 61, comprising no cure catalyst.

78. The clearcoat of claim 61, wherein:

(1) the unblocked polyisocyanate crosslinking agent is a urethane adduct of a diisocyanate containing at least one non-primary isocyanate group with a polyol, has an NCO content of at least 10 weight % (on a 100% solids basis), and has an average NCO functionality of greater than two; and (2) the surface active isocyanate reactive material contains hydroxyl groups, further contains anion generating functionality which is neutralized in an amount sufficient to render the surface active isocyanate reactive material water-dispersible, and is selected from the group consisting of olefinic copolymers and polyesters, the unblocked polyisocyanate crosslinking agent and the surface active isocyanate reactive material being present in amounts such that isocyanate:isocyanate reactive functionality ratio is in the range of from about 0.8:1 to about 1.2:1.

79. The clearcoat of claim 78, wherein the polyol is trimethylolpropane.

80. The clearcoat of claim 79, wherein the diisocyanate is meta-α,α,α',α'-tetramethylxylylenediisocyanate.

* * * * *